United States Patent [19]
Arai et al.

[11] Patent Number: 5,911,420
[45] Date of Patent: Jun. 15, 1999

[54] CHUCK SPINDLE APPARATUS

[75] Inventors: Shigehiro Arai; Masaharu Sugiyama, both of Narashino, Japan

[73] Assignee: Seiko Seiki Kabushiki Kaisha, Japan

[21] Appl. No.: 08/733,966

[22] Filed: Oct. 18, 1996

[30] Foreign Application Priority Data

Oct. 30, 1995 [JP] Japan .................................. 7-282000

[51] Int. Cl.⁶ .................................................. B23B 31/36
[52] U.S. Cl. ...................................................... 279/5; 279/6
[58] Field of Search ............................................ 279/5, 6

[56] References Cited

U.S. PATENT DOCUMENTS

| | | | |
|---|---|---|---|
| 3,680,876 | 8/1972 | Okada | 279/6 |
| 3,881,735 | 5/1975 | Joyce | 279/6 |

FOREIGN PATENT DOCUMENTS

| | | | |
|---|---|---|---|
| 152306 | 7/1986 | Japan | 279/6 |
| 104501 | 5/1991 | Japan | 279/6 |

*Primary Examiner*—Steven C. Bishop
*Attorney, Agent, or Firm*—Adams & Wilks

[57] ABSTRACT

A chuck spindle apparatus comprises a chuck spindle mounted for rotation about a central rotational axis, a chuck main body integrally connected to a forward end of the chuck spindle for rotation therewith, and an indexing device. The chuck main body has a chuck portion for bringing any one of a series of fabrication centers of a workpiece into coincidence with the central rotational axis to thereby chuck the workpiece. The indexing device is disposed within the chuck main body for moving the chuck portion of the chuck main body to bring another one of the fabrication centers of the workpiece into coincidence with the central rotational axis while the workpiece is chucked by the chuck portion of the chuck main body.

34 Claims, 13 Drawing Sheets

CHUCK SPINDLE APPARATUS

BACKGROUND OF THE INVENTION

The present invention relates to a chuck spindle apparatus which is suitable for high precision fabrication of a work having a plurality of fabrication centers in regard to the surrounding portion of each of the fabrication centers.

Generally, in a rotatable chuck apparatus, in a case where there are a plurality of fabrication centers in a work, unless each fabrication center is made individually independently to coincide with a rotation center of the chuck apparatus, the surrounding portion thereof cannot be fabricated.

For this reason, when the surrounding portion of any one of the fabrication centers is finished, it is needed to bring another fabrication center into coincidence with the rotation center of the chuck apparatus.

When performing such individual center-to-center interfitting, the work is re-chucked on the same chuck or another chuck using manpower, self-supply device, or the like.

However, the technique of re-chucking the work as in the prior art involves the problems such as an increase in the time length for attaching and detaching the work and occurrence of a chucking displacement between after and before the re-chucking operation. Therefore, differences unavoidably occur in the chucking precision, causing fabrication errors.

SUMMERY OF THE INVENTION

The present invention has been made under the above-mentioned circumstances and has an object to provide a chuck spindle apparatus which is suitable for high precision fabrication of a work having a plurality of fabrication centers.

In order to attain the above object, according to the present invention, there is provided a chuck spindle apparatus which comprises a chuck spindle that is rotatably disposed, and a chuck main body that is provided on a forward end of the chuck spindle and that is integrally rotated with the chuck spindle, whereby the chuck main body is equipped with a chuck portion for bringing any one of a plurality of fabrication centers of a work into coincidence with a chuck rotation center to thereby chuck the work, and which is characterized in that within the chuck main body there is provided index means which when the chuck portion is chucking the work moves the chuck portion with the work being kept chucked thereby to thereby bring another fabrication center of the work into coincidence with the chuck rotation center.

In the present invention, the chuck portion is moved with the work being kept chucked thereby, and, by this movement, any one of a plurality of the fabrication centers is selectively brought into coincidence with the chuck rotation center. That is, each of the respective fabrication centers can be brought into coincidence with the chuck rotation center without performing re-chucking of the work.

DETAILED DESCRIPTION OF THE PREFERED EMBODIMENTS

An embodiment form of a chuck spindle apparatus according to the present invention will now be explained with reference to FIG. 1 through FIG. 14.

Figure 1:
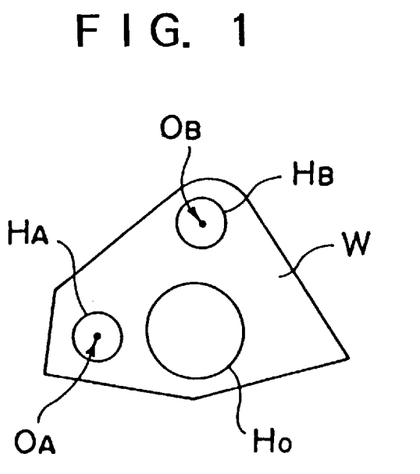
FIG. 1 is a view illustrating a work.

In this embodiment form, as illustrated in FIG. 1, there is used a generally plate-shaped workpiece (hereinafter referred to as a work W) that has a reference hole $H_O$ and two holes $H_A$ and $H_B$ whose centers each differ from that of the reference hole, the respective centers of the holes $H_A$ and $H_B$ being set as fabrication centers $O_A$ and $O_B$.

Figure 2:
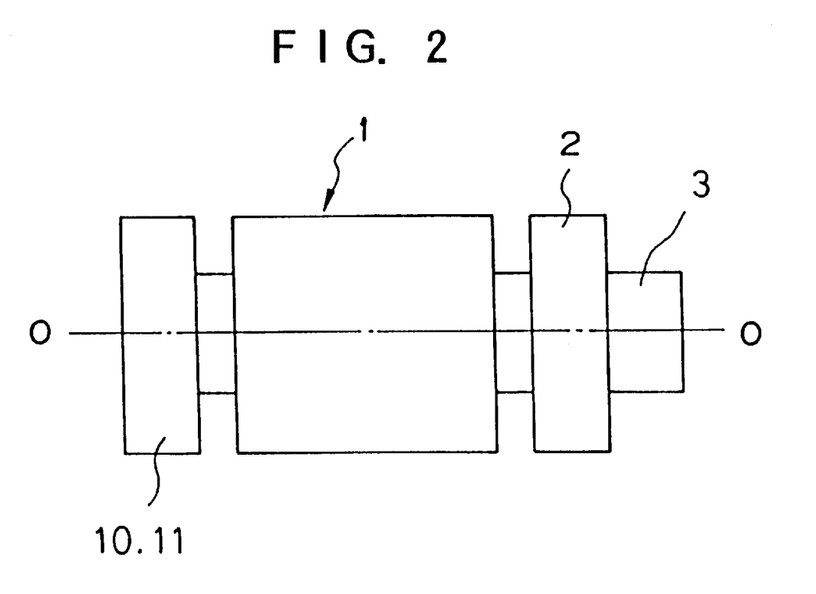
FIG. 2 is an outer appearance view illustrating an apparatus according to an embodiment form of the present invention.

As illustrated in FIG. 2, this chuck spindle apparatus is equipped with a chuck spindle 1 that is rotatably supported for rotation about a central rotational axis or rotation center O—O by, for example, a bearing. A forward end of the chuck spindle 1 is provided with a chuck main body 2 which is arranged to be rotated integrally with the chuck spindle 1.

It is to be noted that the rotation center of the chuck main body 2 is set to coincide with the rotation center of the chuck spindle 1. The both rotation centers are hereinafter called "a chuck rotation center O—O".

Figure 3:
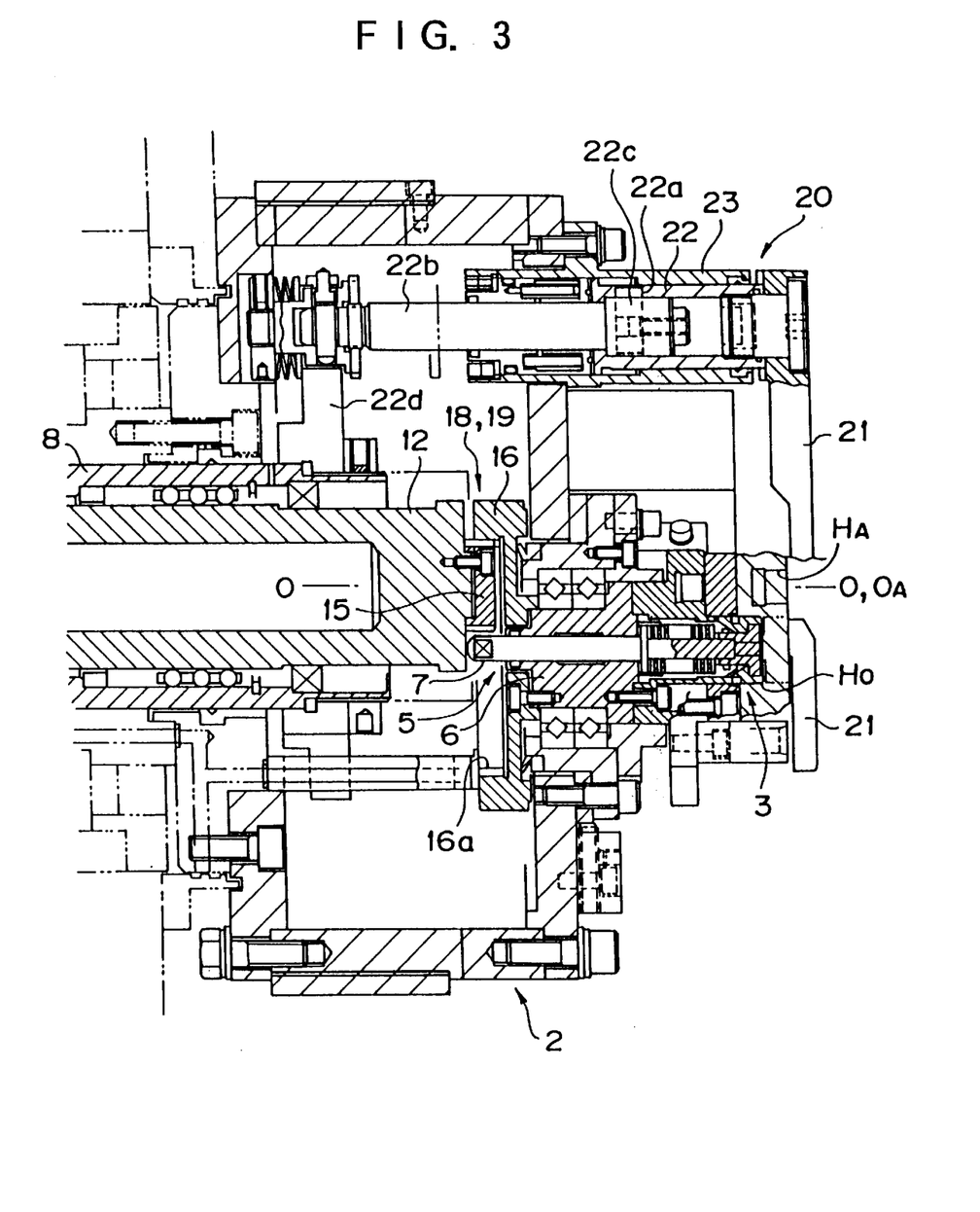
FIG. 3 is a sectional view illustrating a front portion of the apparatus illustrating in FIG. 2.
Figure 4:
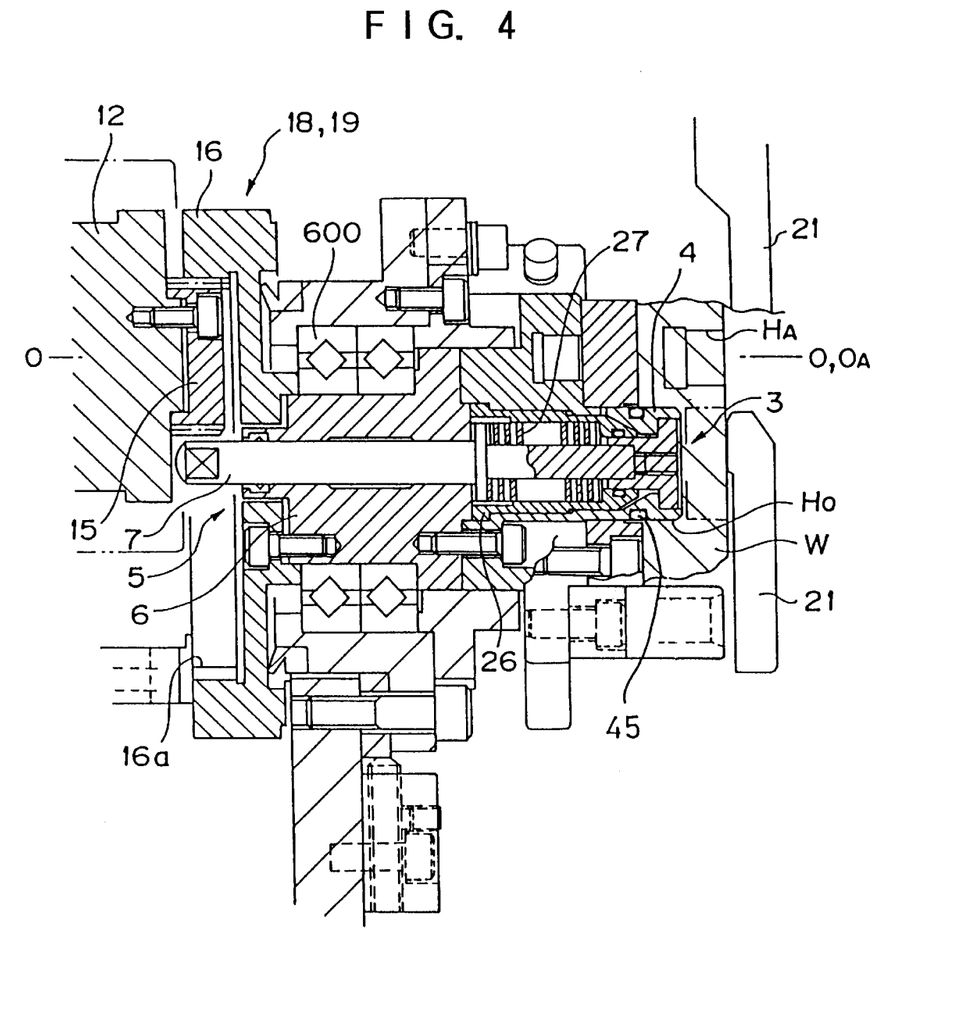
FIG. 4 is an enlarged view of FIG. 3.

As illustrated in FIG. 3, the chuck main body 2 is equipped with a chuck portion 3 for chucking a work W, the chuck portion 3 being constructed of a plurality of openable/closable pawls 4 (see FIG. 5) as illustrated in FIG. 4, which pawls chuck the work with the use of the reference hole $H_O$ thereof.

That is, when the pawls 4 are opened to the outside, these pawls 4 and the reference hole $H_O$ of the work W are brought into mutual abutment with each other. By this abutment force, the work W is chucked.

This chuck portion 3 is provided in such a manner as to have an offset with respect to the chuck rotation center O—O and, by bringing the fabrication center $O_A$ Of the work W and the chuck rotation center O—O into coincidence with each other, the work W can be chucked.

Within the chuck main body 2 there is disposed a swivel mechanism portion 5 that serves as index means, the swivel mechanism portion 5 having an index shaft 6 supported rotatably through a bearing 600, and a forward end of which is mounted integrally on rear portions of the pawls of the chuck portion 3.

A rod 7 that passes through the index shaft 6 between both ends thereof is disposed slidably in the index shaft 6.

The rotation center of the index shaft 6 is located at a position that is equidistant from each of the fabrication centers $O_A$ and $O_B$ of the work W and that brings each of these fabrication centers $O_A$ and $O_B$ into coincidence with the chuck rotation center O—O.

Since this embodiment form is directed to handling the work W in which the distances of the reference hole $H_O$ as measured from the respective fabrication centers $O_A$ and $O_B$ differ from each other, the rotation center of the index shaft 6 and the reference hole $H_O$ cannot be brought into mutual coincidence with each other. Therefore, the chuck main body 2 and the rod 7 are provided eccentrically from the rotation center of the index shaft 6.

In the swivel mechanism portion 5 having the above-mentioned construction, when the index shaft 6 is rotated, the rod 7 and chuck portion 3 make their swivel movements about a point which is equidistant from each of the fabrication centers $O_A$ and $O_B$, that is, a swivel center. As a result of this, in the work W, instead of the fabrication center $O_A$ thereof, another fabrication center $O_B$ thereof is brought into coincidence with the chuck rotation center O—O (see FIG. 6).

When the attitude of the work W changes due to the swivel movement of the chuck portion 3, the center of gravity of the work W shifts, with the result that it is also likely that the center of gravity of the chuck main body 2 as a whole shifts.

Figure 6:
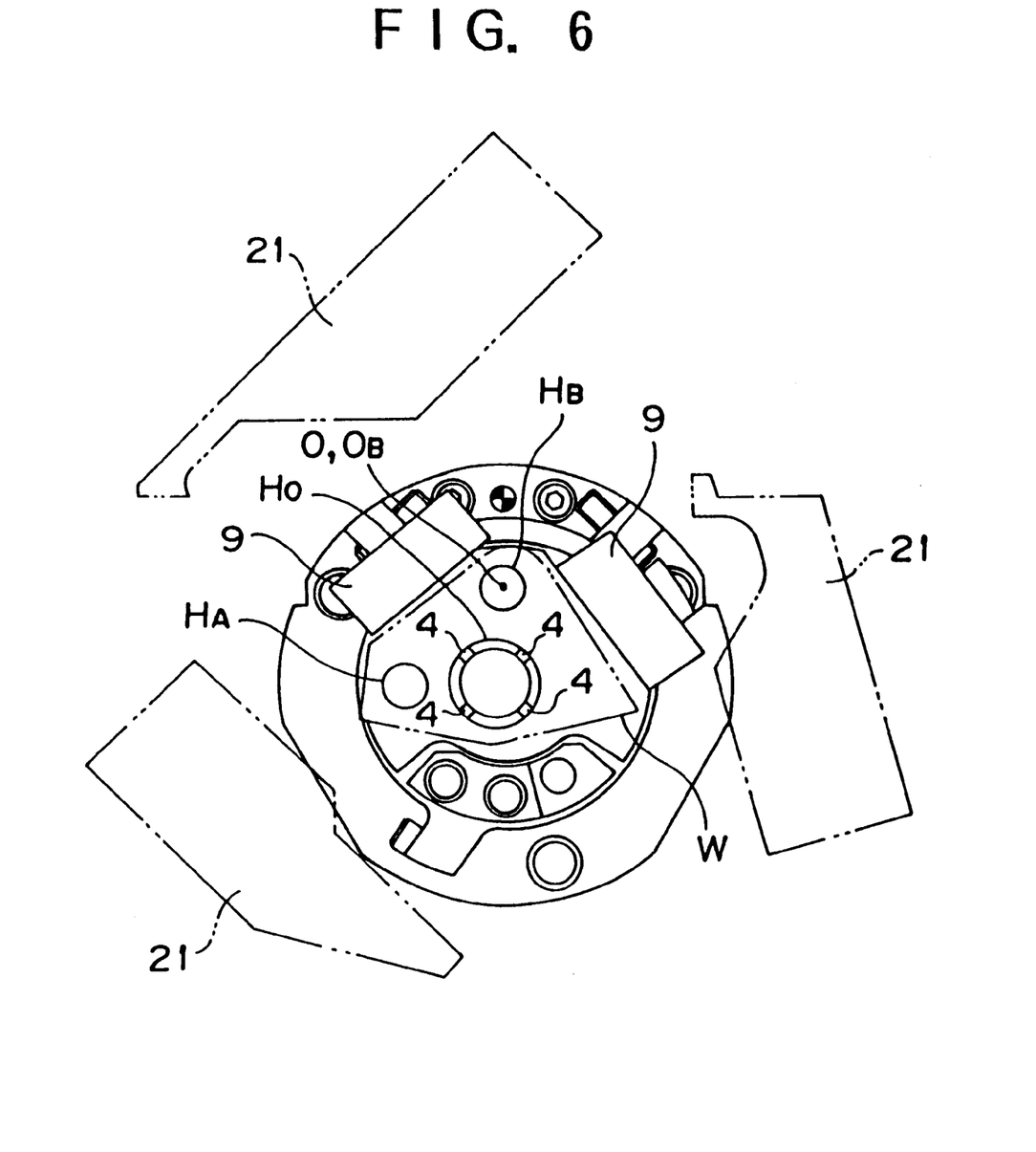
FIG. 6 is a view illustrating the operation of the apparatus illustrated in FIG. 2.

For this reason, as illustrated in FIG. 6, balance weights 9 are mounted on the chuck portion 3 as balance means for correcting the shift of the gravity center of the chuck main body as a whole which occurs due to the swivel movement thereof.

With the shift of the gravity center of the chuck main body 2 as a whole that results from the swivel movement of the chuck portion 3 being estimated beforehand, the balance weights 9 are disposed at positions that correct this shift of the gravity center.

In order to cause the chuck portion 3 to make its swivel movement through the operation of the swivel mechanism portion 5, it is needed for a power necessary therefor to be generated on the side of the swivel mechanism portion 5.

Figure 7:
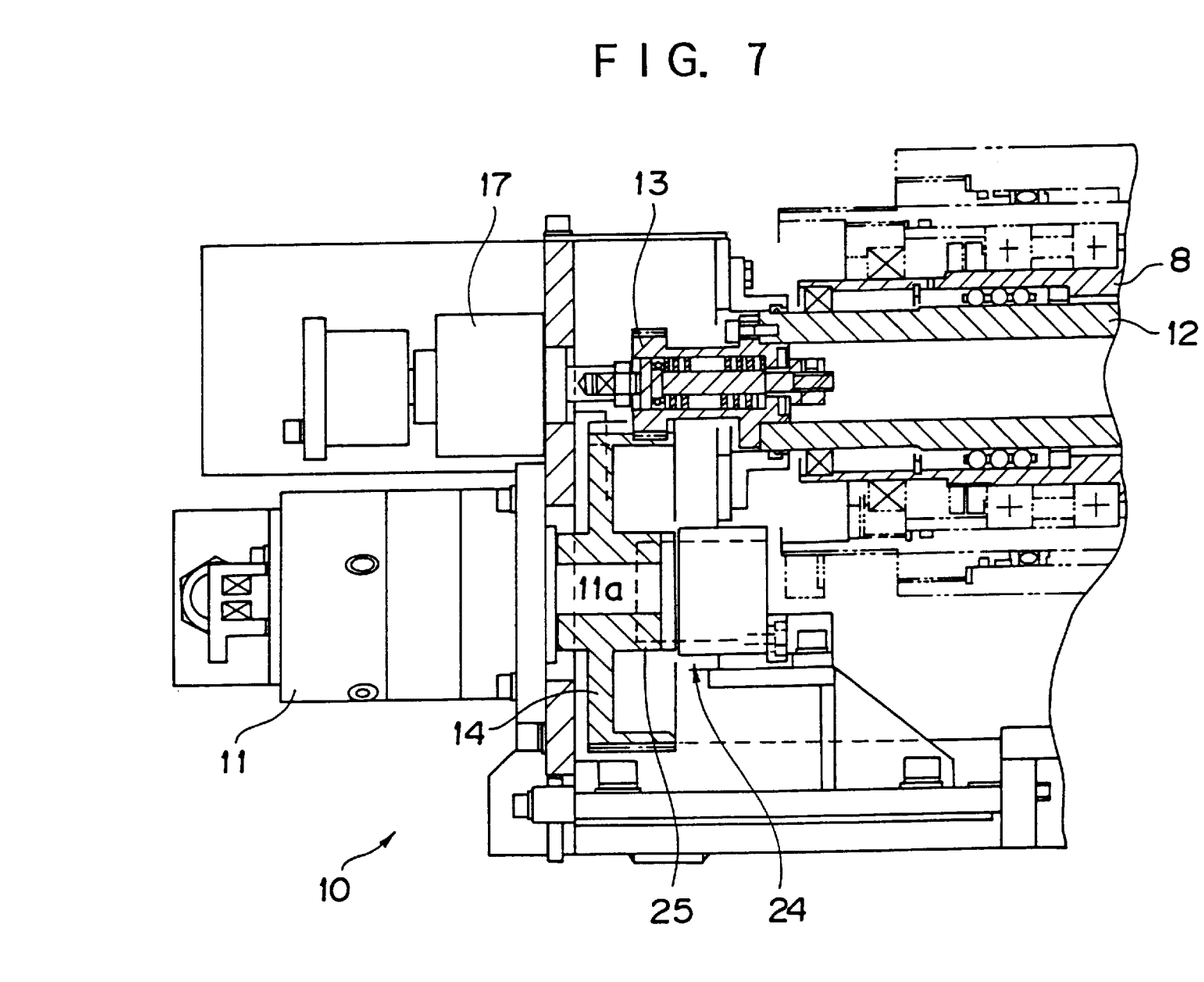
FIG. 7 is a sectional view illustrating a rear portion of the apparatus illustrated in FIG. 2.

This power is obtained from power means 10 as illustrated in FIG. 7 and this power means 10 is constructed of a fixed power source 11 and a drive shaft 12.

The fixed power source 11 is mounted on a fixed portion outside the chuck spindle 1 and is of a stationary type which is not rotated integrally with the chuck spindle 1 and is constructed of a hydraulic rocking motor, etc.

The drive shaft 12 can slide through the interior of a sleeve 8 located within the chuck spindle 1 and is provided in such a manner as to be rotatable independently from the rotation of the chuck spindle 1.

A rear end side of the drive shaft 12 is connected to an output shaft 11a of the fixed power source 11 through spur gears 13, 14 and a forward end side thereof is provided in such a manner as to extend to the side of the swivel mechanism portion 5 (see FIG. 3).

The power that generates in the output shaft 11a of the fixed power source 11 rotates the drive shaft 12 through the spur gears 14 and 13 and, in the form having been thus converted to the rotating force for rotating the drive shaft 12, is transmitted to the side of the swivel mechanism portion 5 and thus becomes a power for causing the swivel movement of the chuck portion 3.

As illustrated in FIG. 4, a driving gear 15 and a driven gear 16 are provided between the forward end of the drive shaft 12 and the swivel mechanism 5.

The driving gear 15 consists of a spur gear and mounted integrally on the forward end of the drive shaft 12 while, on the other hand, the driven gear 16 is constructed as an internal gear having internal teeth 16a and mounted integrally on a rear end of the index shaft 6. The driving gear 15 and the driven gear 16 are engaged with, or disengaged from, each other through the sliding movement of the drive shaft 12.

The connection and disconnection operation between the driving gear 15 and the driven gear 16 is performed by a shaft driving cylinder 17 that is disposed on the side of the rear end of the drive shaft 12 (see FIG. 7).

That is, regarding the connection operation, the rear end of the drive shaft 12 is pushed by a force that is generated in the shaft driving cylinder 17 to thereby cause the drive shaft 12 to slide to the swivel mechanism portion 5 side and thereby cause the driving gear 15 and driven gear 16 to be connected with each other.

On the other hand, regarding the disconnection operation, the shaft driving cylinder 17 is driven in the opposite direction to thereby pull the drive shaft 12 and thereby return it to its original position, thereby disconnecting the driving gear 15 and driven gear 16 from each other.

When the swivel movement of the chuck portion 3 is made, the driving gear 15 and driven gear 16 are engaged with each other, whereupon the rotating force of the drive shaft 12 is transmitted to the swivel movement mechanism portion 5 side, with the result that the index shaft 6 is rotated. It is to be noted that except for the time when the swivel movement of the chuck portion 3 is made, the both gears 15 and 16 are separated from each other.

That is, the driving gear 15 and driven gear 16 have a function as power transmission means 18 for transmitting power from the power means 10 (fixed power source 11 and drive shaft 12) to the index means (swivel mechanism portion 5) side and a function as contact breaker means 19 which in the power transmission course connects and disconnects this course.

As illustrated in FIG. 3, the chuck main body 2 has a clamp mechanism portion 20 which is provided as means for preventing the phase shift of the swivel mechanism portion 5 due to the rotation of the chuck spindle 1 and which is constructed of fingers 21.

The fingers 21 are disposed on a front surface of the chuck portion 3 and forward ends thereof are provided as abutment portions for abutting against the work W.

Rear portions of the fingers 21 are connected to grooved sleeves 22. The grooved sleeve 22 is provided slidably in a guide bush 23. Also, a pin 22c that is integral with a shaft 22b is fitted into a reed groove 22a of the grooved sleeve 22. Further, the shaft 22b is connected to the above-mentioned sleeve 8 through a triangular face plate 22d.

In this clamp mechanism portion 20, when the sleeve 8 advances, the shaft 22b and the pin 22c move through the triangular face plate 22d in the same direction, with the result that the grooved sleeve 22 is caused to swivel while advanced by the pin 22c and the reed groove 22a. As a result of this, the fingers 21 separate outwardly from the surface of the work W (see FIG. 6).

On the other hand, when the sleeve 8 is retreated, the operation that is reverse from that mentioned above is performed. That is, the sleeve 22 and fingers 21 are caused to swivel while retreated. As a result of this, the fingers 21 press the work W from the surface thereof to thereby clamp the work W.

At this time, the work clamping forces of the fingers 21 extend from the work W to the index shaft 6 through the chuck portion 3 to thereby inhibit the rotation of the index shaft 6 and thereby make the swivel mechanism portion 5 fixed.

That is, this clamp mechanism portion 20 inhibits the rotation of the index shaft 6 by clamping the work w by the fingers 21 to thereby prevent phase shift of the index shaft 6 relative to the drive shaft 12. It is to be noted that the reason for preventing the phase shift is on one hand to make the engagement between the driving gear 15 and the driven gear 16 smooth and on the other hand to prevent the positional displacement of the work during fabrication thereof.

As illustrated in FIG. 7, a gear brake 24 that serves as drag preventive means is disposed on the side of the output shaft 11a of the fixed power source 11 and this gear brake 24 is equipped with a brake shoe 25 that can abut against the inside of the spur gear 14.

In this gear brake 24, the brake shoe 25 is caused to abut against the spur gear 14 and, by this abutment force, inhibits the rotation of the drive shaft 12 through the spur gears 13, 14 to thereby prevent the drag of the drive shaft 12 that follows the rotation of the chuck spindle 1.

As illustrated in FIG. 4, the rod 7 of the swivel mechanism portion 5 is constructed so as to perform also the opening/closing operation of the chuck portion 3.

That is, although the rod 7 is provided in such a manner as to pass through the both ends of the index shaft 6 as mentioned above, the rod 7 is provided not by being fixed to the index shaft 6 but is disposed in such a manner that it can be moved back and forth with respect to the pawls 4 of the chuck portion 3.

A fixed sleeve 26 is inserted and disposed between the forward end side of the rod 7 and the pawls 4. Inside the sleeve 26 there is mounted a compression spring 27 for retreating the sleeve 26 toward the drive shaft 12 side. Also, the rear end side of the rod 7 is provided in such a manner as to oppose the forward end face of the drive shaft 12.

When this rod 7 is retreated by the compression spring 27 toward the drive shaft 12 side, the pawls 4 of the chuck portion 3 are also retreated in the same direction as the retreat direction of the rod 7. At this time, the pawls 4 are pressed against the forward end portion of the sleeve 26 and become opened while spreading an O-ring 45. Also, when the rod 7 is pushed by the forward end of the drive shaft 12, the pawls 4 become closed by the O-ring 45 becoming contracted.

Next, the operation of the above-constructed chuck spindle apparatus will be explained with reference to FIGS. 4 through 6.

Figure 5:
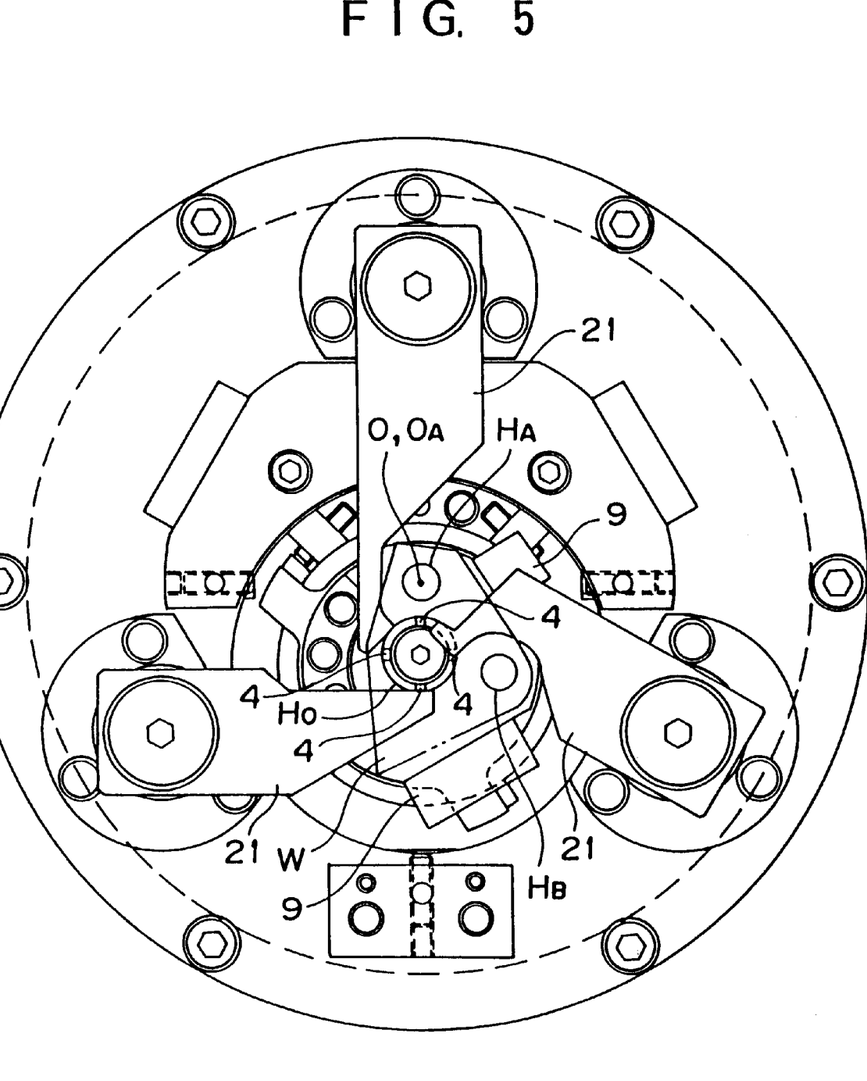
FIG. 5 is a view illustrating the operation of the apparatus illustrated in FIG. 2.

According to this chuck spindle apparatus, the work W is set on the chuck portion 3 with the fabrication center $O_A$ thereof being in coincidence with the chuck rotation center O—O as illustrated in FIG. 4, after which the chuck spindle 1 is rotated (see FIG. 5).

As a result, the chuck spindle 1, chuck portion 3 and work W are rotated integrally and there is obtained the rotation wherein the fabrication center $O_A$ is in coincidence with the chuck rotation center O—O, whereby it becomes possible to fabricate the inner surface of the hole $H_A$ by the use of, for example, a grindstone.

Upon completion of the hole $H_A$ fabrication, the rotation of the chuck spindle 1 is stopped at a prescribed position, whereby the work W is unclamped by this clamp mechanism portion 20. Next, with the work W being kept set on the chuck portion 3, the index operation which enables the fabrication of the hole $H_B$ is performed.

That is, the drive shaft 12 advances toward the rear end of the index shaft 6, whereby the driving gear 15 and driven gear 16 are engaged with each other, with the result that the drive shaft 12 and the index shaft 6 are connected to each other through the both gears 15 and 16.

Thereafter, the drive shaft 12 is rotated and this rotating force is transmitted to the index shaft 6 through the driving gear 15 and driven gear 16, with the result that the index shaft 6 is rotated.

When the index shaft 6 is thus rotated through a prescribed angle, the rod 7, chuck portion 3 and work W are caused to make their integral swivel movement, whereby the fabrication center $O_A$ departs from the chuck rotation center. Finally, as illustrated in FIG. 6, another fabrication center $O_B$ is brought into coincidence with the chuck rotation center O—O.

After the performance of the above-mentioned index operation, clamping of the work W by the clamp mechanism portion 20 is performed. When the rotation of the chuck spindle 1 is thereafter restarted, there is obtained this time the rotation wherein another fabrication center $O_B$ is in coincidence with the chuck rotation center O—O, with the result that the fabrication of another hole $H_B$ that is made using, for example, a grindstone becomes possible. That is, the fabrication of another hole $H_B$ can be performed as is without re-chucking the work W.

The apparatus of this embodiment form is one which is arranged such that the chuck portion 3 is caused to swivel with the work W being chucked thereon, whereby one of the fabrication centers $O_A$ and $O_B$ of the work W is made selectively to coincide with the chuck rotation center O—O. For this reason, every one of the fabrication centers $O_A$ and $O_B$ can be made one after another to coincide with the chuck rotation center O—O without performing re-chucking of the work W. This makes it possible to omit the re-chucking time and labor, to shorten the fabrication time length, to prevent the chucking displacement resulting from such re-chucking and to enhance the fabrication precision of the work W. It is to be noted that the fabrication method that uses this chucking technique is not limited to the inside diameter fabrication of, for example, a hole and can be easily applied to the outside diameter fabrication of, for example, a circular cylinder.

Figure 8:
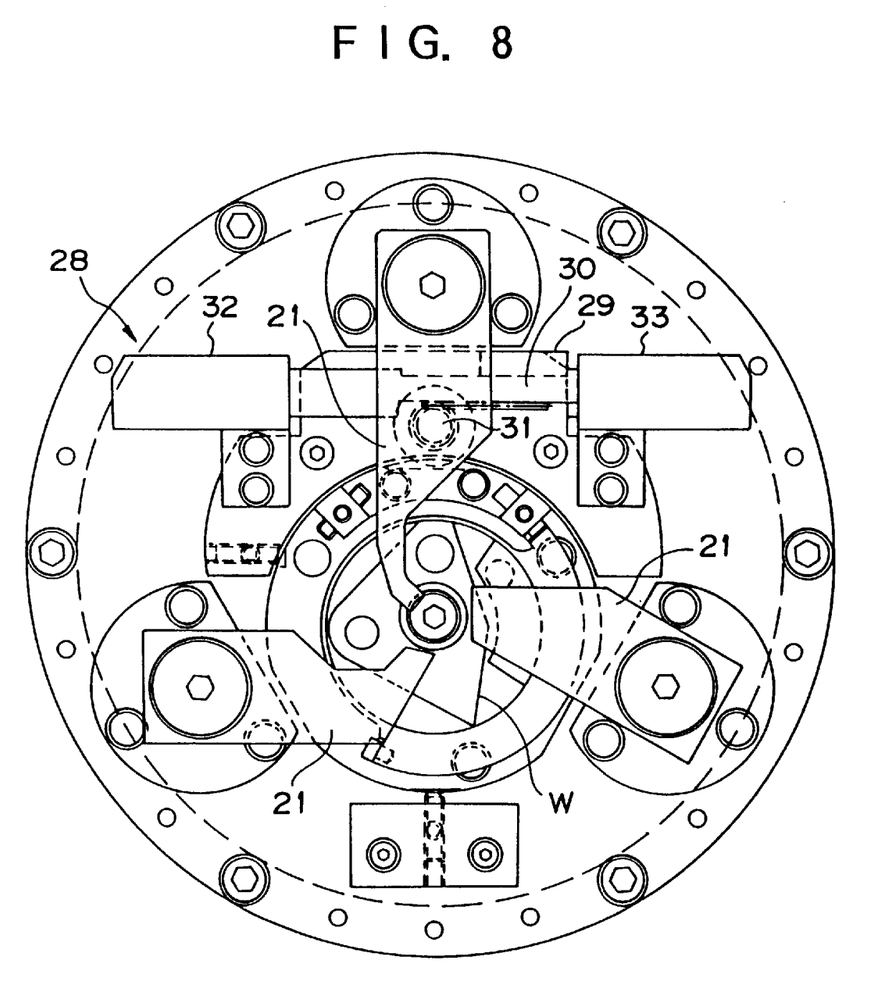
FIG. 8 is a view illustrating an apparatus according to another embodiment form of the present invention.

It is to be noted that, regarding the balance means, it is possible to apply counterbalance mechanism portion 28 illustrated in FIG. 8.

The counterbalance mechanism portion 28 illustrated in this figure has a counterbalance weight 29 as a weight for correcting shift of the gravity center, the counterbalance weight 29 being mounted on a weight moving rack 30.

Figure 9:
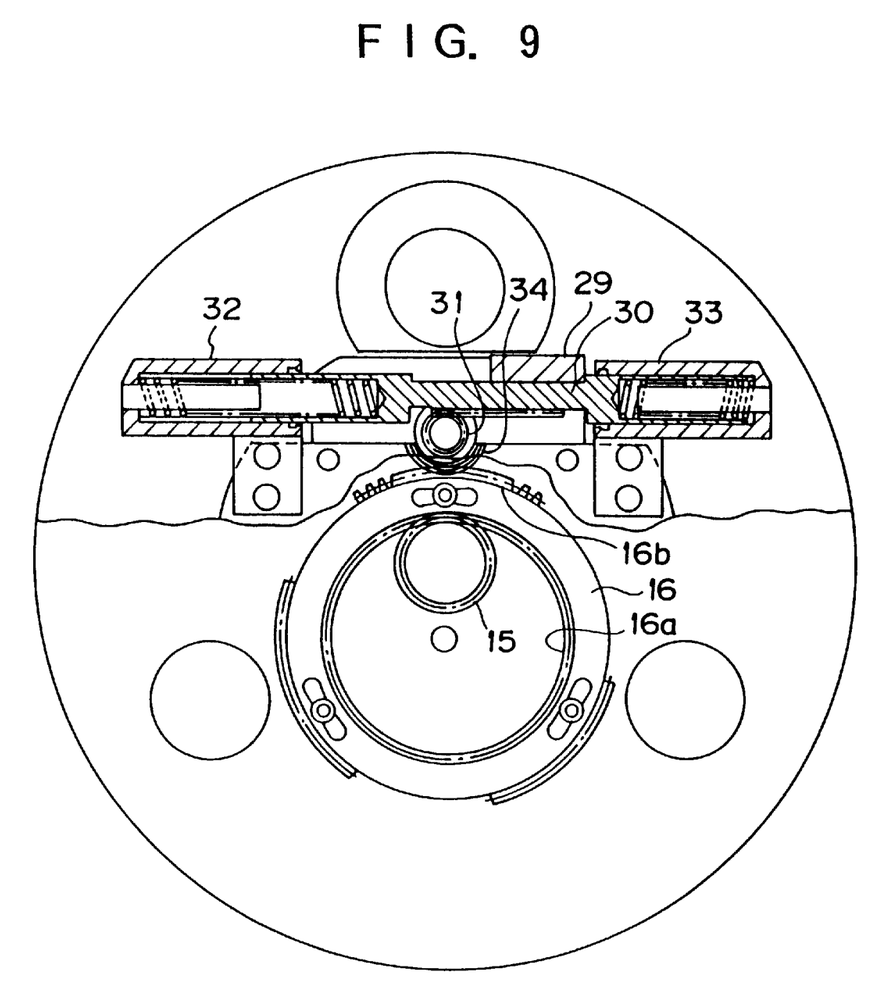
FIG. 9 is a sectional view illustrating the apparatus illustrated in FIG. 8.

As illustrated in FIG. 9, the weight moving rack 30 is engaged with a pinion 31 and is slidably supported at both ends by a pair of support cylinders 32 and 33. It is to be noted that the support cylinders 32 and 33 are mounted on the chuck main body 2.

Figure 10:
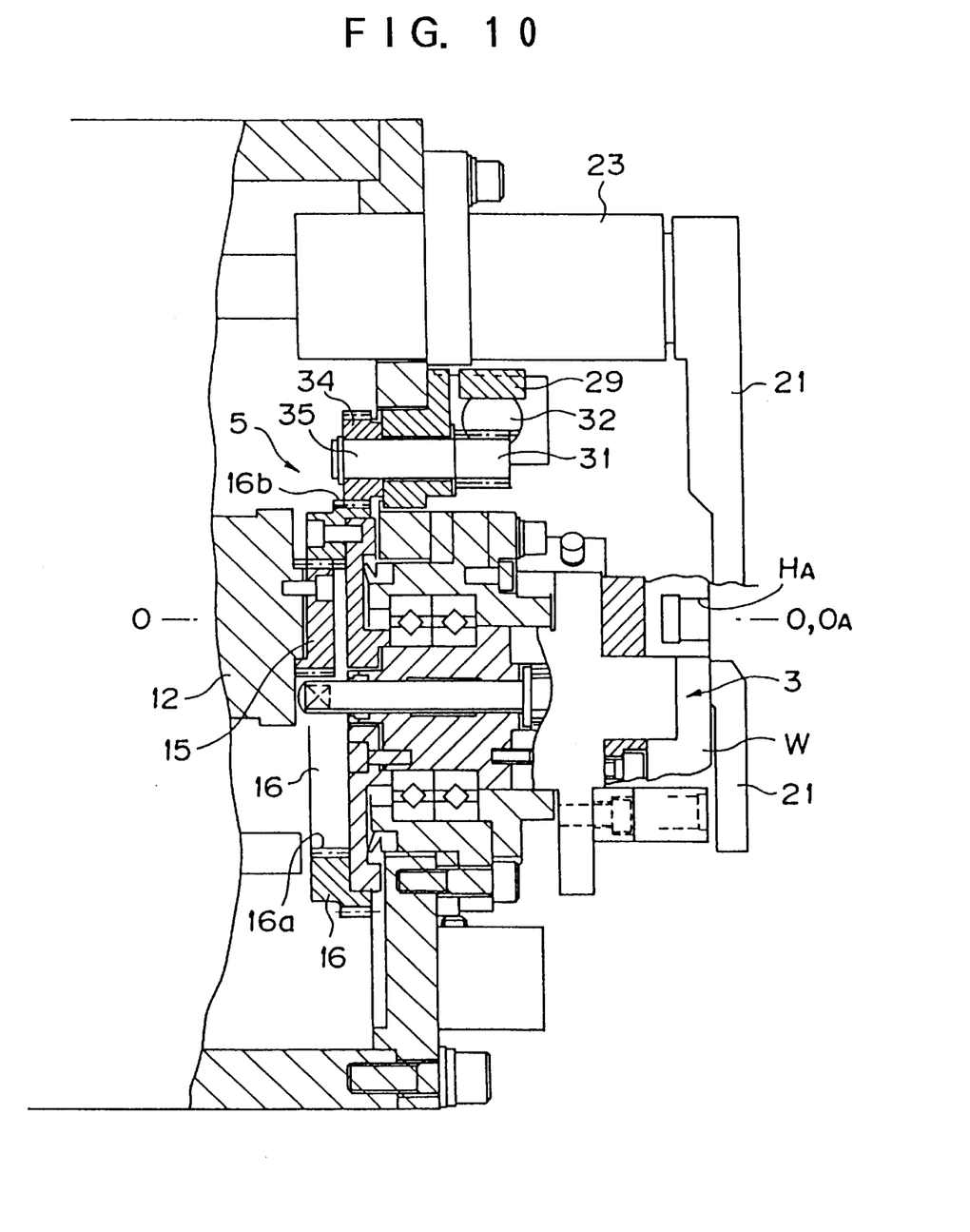
FIG. 10 is a sectional view illustrating the apparatus illustrated in FIG. 8.

The power for moving the counterbalance weight 29 is obtained from the drive shaft 12 side as illustrated in FIG. 10.

That is, the driven gear 16 of the swivel mechanism portion 5 is provided with external teeth 16b on its outer peripheral surface, the external teeth 16b being connected to the pinion 31 of the counterbalance mechanism portion 28 through a gear 34 and a pinion shaft 35. It is to be noted that the driven gear 16 is engaged with the driving gear 15 of the drive shaft 12 through the inner teeth 16a formed inside the same.

In the above-constructed counterbalance mechanism portion 28, when at the time of the swivel movement of the chuck portion 3 the drive shaft 12 is rotated, the rotating force thereof is transmitted to the weight movement rack 30 side through the driving gear 15, driven gear 16, gear 34, pinion shaft 35 and pinion 31, whereby the counterbalance weight 29 is slid integrally with the weight moving rack 30.

That is, when the attitude of the work W changes as a result of the swivel movement of the chuck portion 3, the center of gravity of the work W is shifted and the center of gravity of the chuck main body 2 as a whole is resultantly shifted. However, the counterbalance weight 29 is slid in such a direction as to correct this shift of the gravity center, whereupon the shift of the gravity center is corrected.

Figure 11:
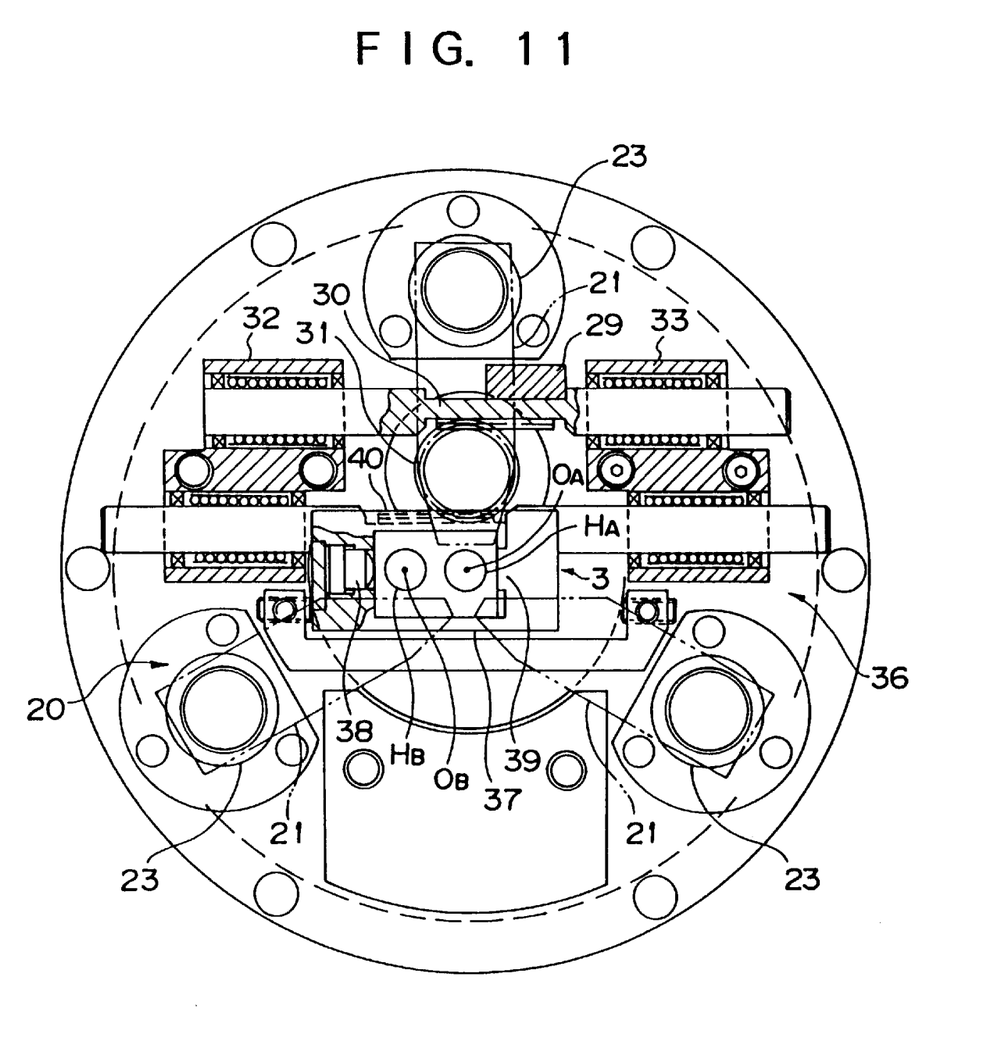
FIG. 11 is a view illustrating an apparatus according to still another embodiment form of the present invention.

Regarding the index means, a slide mechanism portion 36 such as that illustrated in FIG. 11 can be applied.

In this case, unlike the above-mentioned embodiment form, there is used the work 1 that has no reference hole $H_O$ (see FIG. 1) and only two holes $H_A$ and $H_B$ whose centers differ from each other and respective centers of these holes $H_A$ and $H_B$ are set to be fabrication centers $O_A$ and $O_B$. Also, regarding the chuck portion 3, there is adopted one wherein chucking is performed with the work W being sandwiched between a clamper 38 of a packing plate 37 and a setting reference portion 39.

Figure 12:
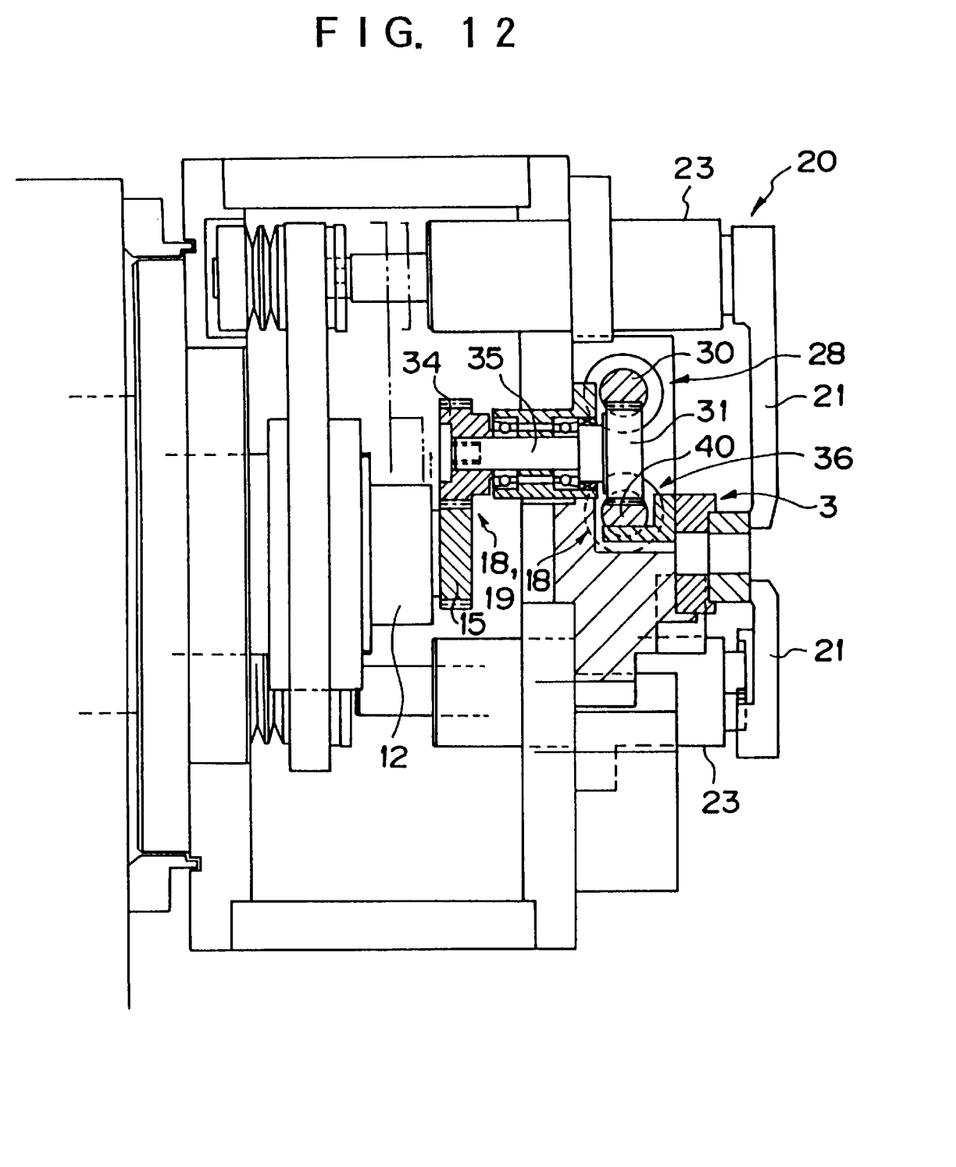
FIG. 12 is a sectional view illustrating the apparatus illustrated in FIG. 11.

As illustrated in FIG. 12, the slide mechanism portion 36 has a chuck moving rack 40 that is intended not to cause swivel of the chuck portion 3 but to cause slide thereof. The chuck moving rack 40 is mounted integrally on the chuck portion 3 and is provided so as to engage with the pinion 31 of the counterbalance mechanism portion 28.

It is arranged for the pinion 31 of the counterbalance mechanism portion 28 to be connected directly to the driving gear 15 through the pinion shaft 35 and gear 34.

The power needed for sliding the chuck portion 3 is obtained from the drive shaft 12 side through the chuck moving rack 40, pinion 31, pinion shaft 35, gear 34 and driving gear 15.

That is, the pinion 31 and chuck moving rack 40 function as the power transmission means 18 for transmitting power from the power means 10 (fixed power source 11 and drive shaft 12) to the index means (slide mechanism portion 36) side.

In the above-constructed slide mechanism portion 30, when the drive shaft 12 is rotated, the resulting rotating force is transmitted to the chuck moving rack 40 through the driving gear 15, gear 34, pinion shaft 35 and pinion 31, whereby the chuck portion 3 is slid integrally with the chuck moving rack 40. As a result, in the work W, instead of the fabrication center $O_A$, another fabrication center $O_B$ is newly brought into coincidence with the chuck rotation center O—O.

At this time, the counterbalance weight 29 of the counterbalance mechanism portion 28 is slid in a direction that is opposite to that in which the chuck portion 3 is slid to thereby correct the shift of the gravity center of the chuck main body 2 as a whole due to the slide of the chuck portion 3 and the work W.

The clamp mechanism portion 20 illustrated in FIG. 11 is provided as phase shift preventive means for the slide mechanism portion 30 and, as this clamp mechanism portion, there is adopted a construction wherein the fingers 21 are pressed against the work W from the surface thereof to thereby clamp the same.

In this case, the work clamping force of the fingers 21 extends from the work W to the chuck moving rack 18 side through the chuck portion 3 to thereby make the slide mechanism portion 30 fixed.

Figure 13:
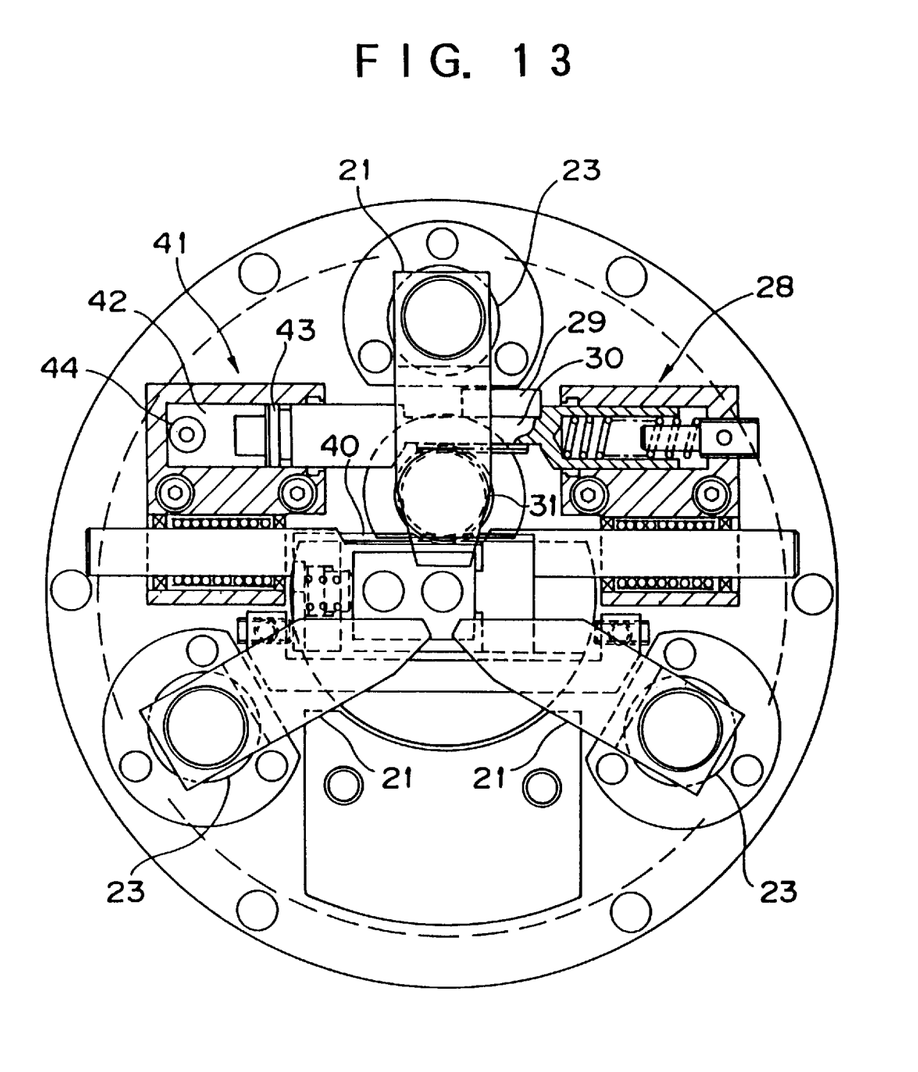
FIG. 13 is a view illustrating an apparatus according to a further embodiment form of the present invention. And, FIG. 14 is a sectional view illustrating the apparatus illustrated in FIG. 13.

Regarding the power means 10, it is also possible to apply a rotary power source 41 such as that illustrated in FIG. 13.

The rotary power source 41 illustrated in this figure is constructed of an air cylinders 42 that is mounted on the chuck main body 2 and a piston 43 that is slidably disposed within the air cylinder 42. It is provided as the rotary power source that is rotated integrally with the chuck main body 2 and chuck spindle 1.

The piston 43 is one which is provided on an end portion of the weight moving rack 30 of the counterbalance mechanism portion 28 illustrated in FIG. 8. The air cylinder 42 is one which is disposed instead of the support cylinder 32 of the counterbalance mechanism portion 28.

That is, the piston 43 is connected to the chuck moving rack 40 through the weight moving rack 30 and pinion 31 (see FIG. 14) and supply of air to the air cylinder 42 is performed through a supply passage 44.

Figure 14:
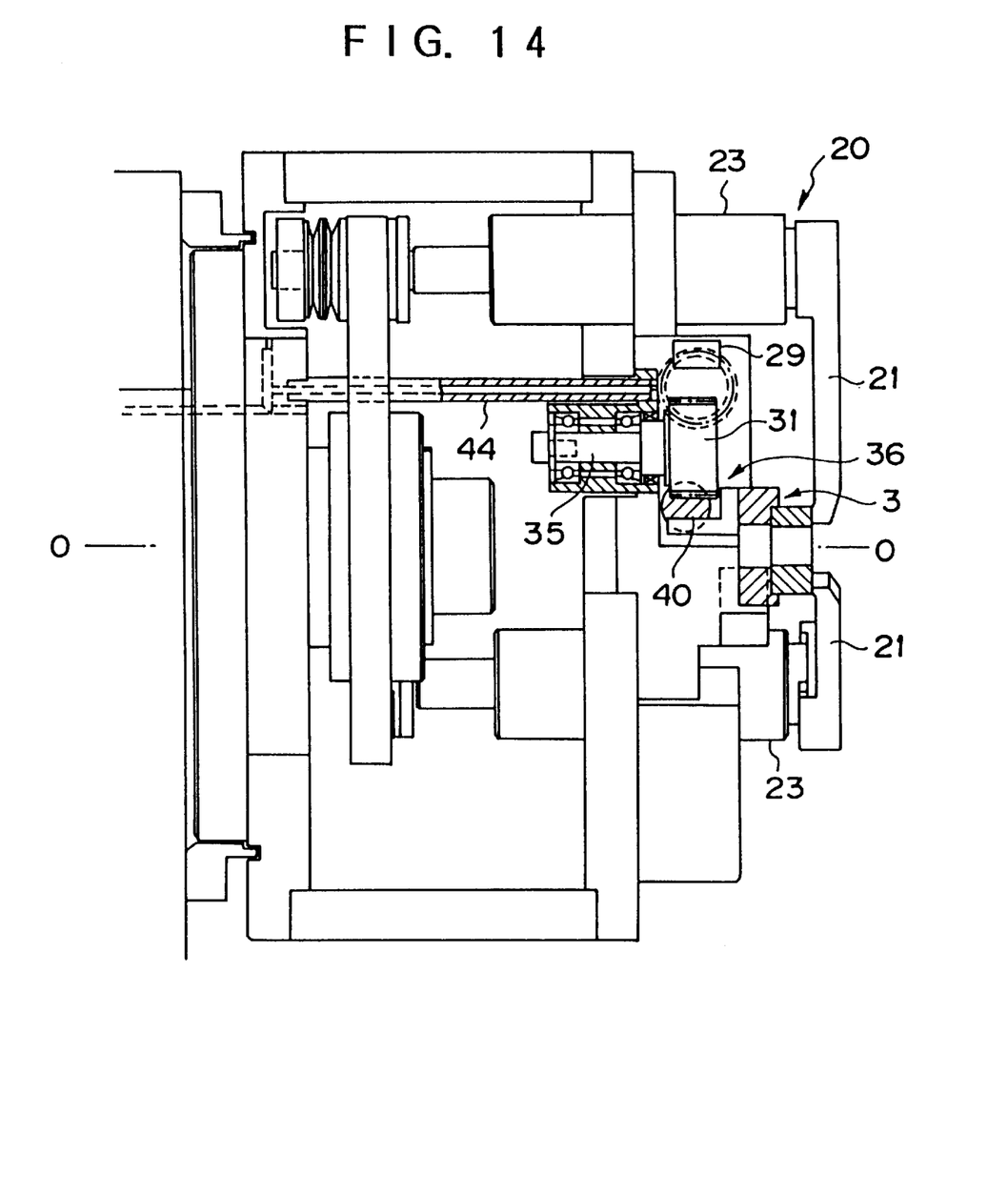

In the above-constructed rotary power source 41, when the air cylinder 42 operates and the piston 43 slides horizontally the counterbalance weight 29 and chuck portion 3 make their sliding movement. That is, the propulsive force of the piston 43 is transmitted from the weight moving rack 30 also to the chuck moving rack 40 through the pinion 31. As a result, both racks 30 and 40 are moved in interlocked relation with each other, whereupon the counterbalance weight 29 slides integrally with one rack 30 and the chuck portion 3 slides integrally with the other rack 40.

When the chuck portion 3 slides in such a way, in the work W another new fabrication center $O_B$ instead of the fabrication center $O_A$ is brought into coincidence with the chuck rotation center O—O. Also, the counterbalance weight 29 slides in an opposite direction to that in which the chuck portion 3 slides to thereby correct the shift of the gravity center of the chuck main body 2 as a whole due to the sliding movement of the chuck portion 3 and work W.

Regarding the driving gear 15 and driven gear 16, both gears can be constructed using not gears but rollers. In this case, the driving gear 15 is made to be a driving roller and there is used instead of the driven gear 16 a driven roller that rotates in abutment therewith.

Also, regarding the driving gear 15 and driven gear 16, both gears can be also constructed using not roller but pulleys. In this case, the driving gear 15 is made to be a driving pulley and there is used instead of the driven gear 16 a driven pulley that is interlocked therewith through a belt.

Regarding the drive shaft 12, this drive shaft can be also provided not inside but outside the chuck spindle 1.

The air cylinder 42 may be changed to an oil-pressure operated cylinder.

The chuck spindle apparatus according to the present invention is one which is constructed such that the chuck portion swivels with the work being kept chucked thereby, whereupon one of the fabrication center of the work is brought selectively into coincidence with the chuck rotation center. For this reason, every one of the fabrication centers can be made to coincide one after another with the chuck rotation center without performing re-chucking of the work.

Therefore, this apparats is suitable to omit the re-chucking time and labor, shorten the fabrication time length, prevent the chucking displacement resulting from the re-chucking operation and enhance the fabrication precision of the work.

What is claimed is:

1. A chuck spindle apparatus comprising: a chuck spindle mounted for rotation about a central rotational axis; a chuck main body integrally connected to a forward end of the chuck spindle for rotation therewith, the chuck main body having a chuck portion for bringing any one of a plurality of fabrication centers of a workpiece into coincidence with the central rotational axis to thereby chuck the workpiece; and index means disposed within the chuck main body for moving the chuck portion of the chuck main body to bring another one of the plurality of fabrication centers of the workpiece into coincidence with the central rotational axis while the workpiece is chucked by the chuck portion of the chuck main body.

2. A chuck spindle apparatus as set forth in claim 1; wherein the index means comprises a swivel mechanism for swiveling the chuck portion of the chuck main body about a point defining a swivel center that is equidistant from each of the fabrication centers of the workpiece while the workpiece is maintained chucked by the chuck portion of the chuck main body.

3. A chuck spindle apparatus as set forth in claim 1; further comprising balance means for correcting a shift of the gravity center of the chuck main body due to movement of the chuck portion of the chuck main body.

4. A chuck spindle apparatus as set forth in claim 1; further comprising power means for generating power for effecting movement of the chuck portion of the chuck main body by the index means.

5. A chuck spindle apparatus as set forth in claim 2: further comprising phase shift preventive means for preventing a phase shift of the swivel mechanism due to the rotation of the chuck spindle.

6. A chuck spindle apparatus as set forth in claim 3; wherein the balance means comprises a balance weight disposed at a preselected position for correcting a previously estimated shift of the gravity center of the chuck main body.

7. A chuck spindle apparatus as set forth in claim 3; wherein the balance means comprises a counterbalance mechanism having a counterbalance weight for movement in a direction to correct a shift of the gravity center of the chuck main body due to movement of the chuck portion of the chuck main body.

8. A chuck spindle apparatus as set forth in claim 4; wherein the power means comprises a power source fixedly mounted on an outer portion of the chuck spindle for generating the power, and a drive shaft mounted inside or outside of the chuck spindle for rotation independently from the rotation of the chuck spindle, the rotation of the drive shaft transmitting the power generated by the fixed power source to the index means.

9. A chuck spindle apparatus as set forth in claim 4; wherein the power means comprises a rotary power source connected to rotationally drive the chuck spindle.

10. A chuck spindle apparatus as set forth in claim 4; further comprising power transmission means for transmitting power from the power means to the index means, the power transmission means comprising a driving gear mounted for rotation by the power of the power means, and a driven gear connected to the driving gear and disposed on a rear side of the index means.

11. A chuck spindle apparatus as set forth in claim 4; further comprising power transmission means for transmitting power from the power means to the index means, the power transmission means comprising a driving roller mounted for rotation by the power of the power means, and a driven roller connected to the driving roller for rotation therewith and disposed on a rear side of the index means.

12. A chuck spindle apparatus as set forth in claim 4; further comprising power transmission means for transmitting power from the power means to the index means, the power transmission ms comprising a driving pulley mounted for rotation by the power of the power means, and a driven pulley connected to the driving pulley for rotation therewith and disposed on a rear side of the index means.

13. A chuck spindle apparatus as set forth in claim 4; further comprising power transmission means for transmitting power from the power means to the index means, the power transmission means comprising a pinion mounted for rotation by the power of the power means, and a rack connected to the pinion and mounted on a side of the chuck portion of the chuck main body.

14. A chuck spindle apparatus as set forth in claim 8; further comprising drag preventive means for preventing drag of the drive shaft due to rotation of the chuck spindle.

15. A chuck spindle apparatus comprising: a chuck spindle mounted for rotation about a central rotational axis; a chuck main body integrally connected to a forward end of the chuck spindle for rotation therewith, the chuck main body having a chuck portion for bringing any one of a plurality of fabrication centers of a workpiece into coincidence with the central rotational axis to thereby chuck the workpiece; and index means disposed within the chuck main body for moving the chuck portion of the chuck main body to bring another one of the plurality of fabrication centers of the workpiece into coincidence with the central rotational axis while the workpiece is chucked by the chuck portion of the chuck main body, the index means comprising a slide mechanism for sliding the chuck portion of the chuck main body while the workpiece is maintained chucked by the chuck portion of the chuck main body.

16. A chuck spindle apparatus as set forth in claim 15; further comprising phase shift preventive means for preventing a phase shift of the slide mechanism due to the rotation of the chuck spindle.

17. A chuck spindle apparatus as set forth in claim 4; further comprising means for connecting and disconnecting the transmission of power from the power means to the index means.

18. A chuck spindle apparatus as set forth in claim 1; wherein the workpiece is generally plate-shaped.

19. A spindle apparatus comprising:
  a spindle mounted on the base for rotation about a central rotational axis;
  a main body integrally connected to the spindle for rotation therewith, the main body having a chuck portion for chucking a workpiece having a plurality of fabrication centers while bringing any one of the fabrication centers into coincidence with the central rotational axis; and
  an indexing device disposed within the main body for moving the chuck portion of the main body to bring another one of the plurality of fabrication centers of the workpiece into coincidence with the central rotational axis while the workpiece is chucked by the chuck portion of the main body.

20. A spindle apparatus as set forth in claim 19; wherein the indexing device comprises a swivel mechanism for swiveling the chuck portion of the main body about a point defining a swivel center that is equidistant from each of the fabrication centers of the workpiece while the workpiece is maintained chucked by the chuck portion of the main body.

21. A spindle apparatus as set forth in claim 19; wherein the indexing device comprises a slide mechanism for sliding the chuck portion of the main body while the workpiece is maintained chucked by the chuck portion of the main body.

22. A spindle apparatus as set forth in claim 19; further comprising a balancing device for correcting a shift of the gravity center of the main body due to movement of the chuck portion of the main body.

23. A spindle apparatus as set forth in claim 22; wherein the balance device comprises a balance weight disposed at a preselected position for correcting a previously estimated shift of the gravity center of the main body.

24. A spindle apparatus as set forth in claim 22; wherein the balance device comprises a counterbalance mechanism having a counterbalance weight for movement in a direction to correct a shift of the gravity center of the main body due to movement of the chuck portion of the main body.

25. A spindle apparatus as set forth in claim 19; further comprising a power generating device for generating power for effecting movement of the chuck portion of the main body by the indexing device.

26. A spindle apparatus as set forth in claim 25; wherein the power generating device comprises a power source mounted on the spindle, and a drive shaft mounted in a sleeve disposed in the spindle for sliding movement in the sleeve and for rotation independently from the rotation of the spindle.

27. A spindle apparatus as set forth in claim 25; wherein the power generating device comprises a power source fixedly mounted on an outer portion of the spindle for generating the power, and a drive shaft mounted for rotation independently from the rotation of the spindle, the rotation of the drive shaft transmitting the power generated by the fixed power source to the indexing device.

28. A spindle apparatus as set forth in claim 25; wherein the power generating device comprises a rotary power source connected to rotationally drive the spindle.

29. A spindle apparatus as set forth in claim 25; further comprising a power transmitting device for transmitting power from the power generating device to the indexing device.

30. A spindle apparatus as set forth in claim 29; wherein the power transmitting device comprises a driving gear mounted for rotation by the power of the power generating device, and a driven gear connected to the driving gear and disposed on a rear side of the indexing device.

31. A spindle apparatus as set forth in claim 29; wherein the power transmitting device comprises a driving roller mounted for rotation by the power of the power generating device, and a driven roller connected to the driving roller for rotation therewith and disposed on a rear side of the indexing device.

32. A spindle apparatus as set forth in claim 29; wherein the power transmitting device comprises a driving pulley mounted for rotation by the power of the power generating device, and a driven pulley connected to the driving pulley for rotation therewith and disposed on a rear side of the indexing device.

33. A spindle apparatus as set forth in claim 29; wherein the power transmitting device comprises a pinion mounted for rotation by the power of the power generating device, and a rack connected to the pinion and mounted on a side of the chuck portion of the main body.

34. A spindle apparatus as set forth in claim 19; wherein the workpiece is generally plate-shaped.

* * * * *